US008836257B2

(12) United States Patent
Savitz

(10) Patent No.: US 8,836,257 B2
(45) Date of Patent: Sep. 16, 2014

(54) HOUSEHOLD APPLIANCE INCLUDING A FAN SPEED CONTROLLER

(75) Inventor: George Savitz, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 1209 days.

(21) Appl. No.: 12/248,417

(22) Filed: Oct. 9, 2008

(65) Prior Publication Data

US 2010/0092275 A1    Apr. 15, 2010

(51) Int. Cl.
*H02K 29/06* (2006.01)
*H02P 25/04* (2006.01)
*F24C 15/32* (2006.01)
*H02P 6/18* (2006.01)
*H02P 6/00* (2006.01)
*F24C 7/08* (2006.01)

(52) U.S. Cl.
CPC . *F24C 7/08* (2013.01); *H02P 25/04* (2013.01); *F24C 15/325* (2013.01); *H02P 6/182* (2013.01); *H02P 6/008* (2013.01)
USPC ............ 318/400.32; 318/400.34; 318/400.38; 318/459

(58) Field of Classification Search
CPC ........... H02P 6/182; H02P 6/185; H02P 6/18; H02P 6/20; H02P 6/085; H02P 2209/07; H02P 6/205; H02P 6/147; H02P 621/146; H02P 625/083; H02P 66/181; H02P 629/021; H02P 6/14; H02P 6/16; H02K 29/12; H02K 29/08; H02K 29/10; G04C 3/165; H02H 7/093; G11B 33/144

USPC ............... 318/494, 767, 772, 400.35, 400.34, 318/400.32, 599, 727, 799, 801, 802, 318/400.33, 400.16, 400.23, 400.26, 318/400.24, 400.36, 443, 102, 444, 144, 318/750, 756; 415/1; 417/410
See application file for complete search history.

(56) References Cited

U.S. PATENT DOCUMENTS

| | | | |
|---|---|---|---|
| 3,719,137 A | 3/1973 | Gould | |
| 3,818,297 A * | 6/1974 | Ha et al. ................... | 388/809 |
| 3,961,152 A | 6/1976 | Staats | |
| 4,013,859 A | 3/1977 | Peters, Jr. | |
| 4,109,306 A | 8/1978 | Mason | |
| 4,151,387 A | 4/1979 | Peters, Jr. | |
| 4,400,654 A | 8/1983 | Elliott | |
| 4,409,533 A | 10/1983 | Kawabata | |
| 4,490,596 A | 12/1984 | Hirai et al. | |
| 4,789,834 A | 12/1988 | Koopman | |
| 5,015,827 A | 5/1991 | Kadwell et al. | |
| 5,075,613 A | 12/1991 | Fisher | |
| 5,200,684 A * | 4/1993 | Fisher ...................... | 318/809 |
| 5,408,073 A | 4/1995 | Jeong | |
| 5,440,219 A | 8/1995 | Wilkerson | |
| 5,448,141 A | 9/1995 | Kelley et al. | |
| 5,629,598 A | 5/1997 | Wilkerson | |

(Continued)

*Primary Examiner* — Shawki S Ismail
*Assistant Examiner* — Jorge L Carrasquillo
(74) *Attorney, Agent, or Firm* — James E. Howard; Andre Pallapies

(57) ABSTRACT

A household appliance including a fan speed controller, and a method of controlling fan speed of a household appliance, are provided. The system includes a fan speed controller that cut a voltage to the fan motor, measures an electromotive force (EMF) of the fan motor at a predetermined time after the cutting of the voltage to the fan motor, and compares the measured electromotive force (EMF) to a table.

21 Claims, 13 Drawing Sheets

(56) References Cited

U.S. PATENT DOCUMENTS

| | | | |
|---|---|---|---|
| 5,650,923 A | 7/1997 | Suzuki et al. | |
| 5,828,563 A | 10/1998 | Suzuki et al. | |
| 5,838,127 A | 11/1998 | Young et al. | |
| 5,847,524 A | 12/1998 | Erdman et al. | |
| 6,081,091 A * | 6/2000 | Mitchell et al. | 318/685 |
| 6,147,465 A | 11/2000 | Hollenbeck | |
| 6,215,261 B1 | 4/2001 | Becerra | |
| 6,275,400 B1 | 8/2001 | Ó Breartúin | |
| 6,459,230 B1 * | 10/2002 | Tao | 318/798 |
| 6,600,139 B2 | 7/2003 | Perschl et al. | |
| 6,657,346 B2 | 12/2003 | Pan et al. | |
| 6,801,004 B2 | 10/2004 | Frankel et al. | |
| 6,805,312 B2 | 10/2004 | Capp | |
| 6,850,252 B1 | 2/2005 | Hoffberg | |
| 6,866,202 B2 | 3/2005 | Sigafus et al. | |
| 6,894,454 B2 * | 5/2005 | Patel et al. | 318/700 |
| 6,913,012 B2 | 7/2005 | Divett et al. | |
| 6,919,815 B2 | 7/2005 | Peterson | |
| 6,969,287 B1 | 11/2005 | Motsenbocker | |
| 7,109,448 B2 | 9/2006 | Goranson | |
| 7,148,642 B2 | 12/2006 | Brannen et al. | |
| 7,183,734 B2 * | 2/2007 | Lassen | 318/400.34 |
| 7,279,865 B2 | 10/2007 | Matsuo | |
| 7,293,718 B2 | 11/2007 | Sigafus et al. | |
| 7,301,298 B2 * | 11/2007 | Shao et al. | 318/599 |
| 7,309,846 B2 | 12/2007 | Haberkamm et al. | |
| 7,335,071 B1 | 2/2008 | Motsenbocker | |
| 7,348,754 B2 | 3/2008 | Prasanna | |
| 8,198,853 B2 * | 6/2012 | Savitz | 318/772 |
| 2003/0030408 A1 * | 2/2003 | Ratz et al. | 318/772 |
| 2003/0172919 A1 | 9/2003 | Rabas et al. | |
| 2003/0234624 A1 | 12/2003 | Frankel et al. | |
| 2004/0079355 A1 | 4/2004 | Divett et al. | |
| 2005/0092314 A1 | 5/2005 | Rabas et al. | |
| 2005/0224068 A1 | 10/2005 | Kim et al. | |
| 2005/0236389 A1 | 10/2005 | Goranson | |
| 2006/0214611 A1 * | 9/2006 | Wang et al. | 318/254 |
| 2006/0278216 A1 | 12/2006 | Gagas et al. | |
| 2007/0023420 A1 | 2/2007 | Gagas | |
| 2007/0062513 A1 * | 3/2007 | Gagas | 126/299 D |
| 2007/0145032 A1 | 6/2007 | Graham et al. | |
| 2007/0221199 A1 | 9/2007 | Hake et al. | |
| 2008/0018275 A1 * | 1/2008 | Dooley | 318/268 |

* cited by examiner

HOUSEHOLD APPLIANCE INCLUDING A FAN SPEED CONTROLLER

REFERENCE TO CO-PENDING APPLICATION FOR PATENT

The present application for patent is related to the following co-pending U.S. patent application, entitled "MOTOR SPEED CONTROLLER" by George Savitz, U.S. application Ser. No. 12/248,378, assigned to the assignee hereof, and expressly incorporated by reference herein.

FIELD OF DISCLOSURE

The present invention relates to a household appliance including a fan speed controller, and a method of controlling a fan speed of a household appliance, and more particularly, to a household appliance including a fan speed controller using electromotive force (EMF) conditions within a fan motor, and a method of controlling a fan speed of a household appliance using EMF conditions within a fan motor.

BACKGROUND

Many conventional household appliances include a fan for circulating or moving air within the household appliance or for exhausting air from the household appliance. The fan may be a cooling fan, a re-circulating fan, an exhaust fan, or a convection fan, etc. Some common examples of household appliances having a fan may include a built-in wall oven, a cooktop, a range/oven, a convection oven, or an exhaust or ventilation fan. Other household appliances, such as a refrigerator or freezer, also may include a fan.

Some conventional household appliances may include a single speed fan or a two speed fan. For example, a conventional wall oven commonly includes one or more fans for circulating air within the oven or for exhausting air from the oven, such as a cooling fan. In some conventional wall ovens, it is desirable to use a cooling fan having two-speed settings. For example, a high speed cooling fan setting may be provided for an oven cleaning cycle in which it is desirable to circulate or exhaust a higher volume of air. In this case, the noise volume of the high speed cooling fan setting may be acceptable or tolerable to the consumer because the cleaning cycle is not performed every day or all the time during normal operation. A low speed cooling fan setting may be provided for all other oven functions to minimize noise output. For example, a low speed cooling fan setting may be provided for normal operation (e.g., cooking). The low speed setting may provide a lower or quieter noise volume from the fan during normal operation or ordinary use (e.g., cooking), which commonly is desirable to the consumer.

A conventional two speed fan motor has two windings, and therefore, commonly is more expensive than a single speed fan. The added cost of the two speed fan may result in an increase in manufacturing costs associated with the household appliance.

In many household appliances having a fan, it is desirable to monitor and control the speed of the fan, for example, to detect a failure or slowing of the fan below a predetermined or threshold speed. An integrated Hall effect sensor or device can be used to determine the speed of the fan by directly measuring the rotational speed of the fan motor. However, the added cost of the Hall effect sensor or device may further increase the manufacturing costs associated with the household appliance.

SUMMARY

The present invention recognizes that there is a need to provide a household appliance having a two speed fan motor that is inexpensive and easy to monitor and control. The present invention also recognizes that there is a need for an inexpensive, sensorless fan speed controller that determines the speed of the fan of a household appliance, for example, to detect a failure or slowing of the fan below a predetermined or threshold speed. For example, in a household appliance such as a wall oven, range/oven, or similar household appliance, there is a need to detect the speed of a fan motor to ensure proper operation of a cooling fan for exhausting hot air during a cooking cycle or a self-cleaning cycle to reduce or prevent undesired heating of components of the household appliance and/or the surroundings of the household appliance, thereby improving safety of the household appliance.

The present invention further recognizes that there is a need to provide a household appliance having a two speed fan motor that can provide flexibility in the volume of air that is exhausted from the household appliance, such as a cooking device, during or after a cooking cycle or a self-cleaning cycle. The present invention further recognizes that there is a need to minimize or reduce an amount of noise experienced by a user during operation of the fan motor.

To solve the problems with the conventional household appliances having a fan, the present invention provides a household appliance having a fan speed controller for controlling an AC inductive motor (e.g., AC single-pole or shaded-pole motor). The invention provides an important advantage of reducing costs, for example, because an AC single-phase inductive motor may be less expensive than two or three phase motors that commonly have been used in many conventional systems. Such AC inductive motors also may provide low torque and may be easily defined.

The Hall effect sensor used in some conventional devices also may increase the number of parts and the costs of the appliance. To solve this problem, the present invention eliminates the need for a Hall effect sensor. The present invention provides a household appliance having a sensorless fan speed controller for controlling an AC inductive motor using the electromotive force (EMF) conditions within the motor, and a method of real time motor speed control and detection using the EMF conditions within the motor. The EMF conditions may provide adequate speed sensing and control, for example, for the purposes of application to household appliances without requiring an additional sensor. The present invention provides an inexpensive fan speed motor and motor control that determines, for example, the speed of the fan motor, whether the fan is operating at a minimum speed (i.e., threshold speed), or whether the fan is operating at all. The present invention provides important advantages of reducing the number of parts and reducing the costs associated with the fan motor and motor control.

More particularly, the present invention recognizes that an inductive motor may change voltage instantly, but cannot change current instantly. Therefore, each time the fan motor is cut off (i.e., power is cut off), an inductive spike results. The present invention further recognizes that the EMF is dependent on the speed of the fan at the time the motor is cut off. The present invention takes advantage of these characteristics to provide a sensorless fan speed controller for an AC inductive motor that is inexpensive and easy to monitor and control.

The present invention provides a sensorless fan speed controller that easily detects the speed of the fan of a household appliance, for example, to detect a failure or slowing of the fan below a predetermined or threshold speed. For example, an aspect of the invention operates an AC inductive single-phase or shaded-pole motor, cuts the voltage of the motor for a short period of time, and then measures the amplitude of the back feed voltage or back EMF at a predetermined point in time. The measured back EMF may then be compared to a look-up table to determine the speed of the motor and an evaluation performed to determine whether the speed of the motor is less than a predetermined or threshold value. If the speed of the motor is equal to or greater than the predetermined or threshold value, then the controller may supply a signal that the fan is operating properly each time the speed is evaluated. If the speed of the motor is less than the predetermined or threshold value, then the heating cycle (e.g., a self-cleaning cycle) of the cooking appliance or oven is terminated. In an embodiment, the fan controller also defaults the fan speed to its highest setting if the speed of the motor is less than the predetermined or threshold value. In comparison with the conventional systems and methods, the present invention may reduce cost by providing a system and method that monitors and controls an AC inductive motor and terminates the heating cycle (e.g., a self-cleaning cycle) of a cooking appliance or oven if the speed of the fan motor is less than the predetermined or threshold value.

The present invention further provides a household appliance having a two speed fan motor that can provide flexibility in the volume of air that is circulated within, or exhausted from, the household appliance, such as a cooking appliance during or after a cooking cycle or a self-cleaning cycle. The present invention provides an inexpensive two speed cooling fan that operates at a high speed cooling fan setting, for example, for self-cleaning. The two speed cooling fan also operates at a low speed cooling fan setting, for example, for all other oven functions in order to minimize an amount of noise output experienced by the user. The two speed cooling fan according to the present invention may minimize or reduce an amount of noise output by the fan and fan motor and experienced by a user during operation of the fan. Hence, in contrast to the conventional household appliances having a fan motor, the present invention provides a household appliance having a two speed fan motor that is inexpensive to manufacture and easy to monitor and control.

The present invention recognizes that the trend in motor control design is to provide an ever increasing amount of control of the fan at every moment in time. The conventional motor control designs strive to increase the amount of control for smaller and smaller increments of time. In stark contrast, the present invention diverges from the accepted wisdom in conventional devices and methods and provides periodic motor control instead of continuous motor control at every point in time. That is, the present invention recognizes that periodic motor control may provide important advantages and that instantaneous feedback may not be needed or desirable for providing motor control in many applications, such as in household appliances. The present invention may provide periodic motor control by cutting the power to the motor periodically (e.g., every 20 seconds, 30 seconds, 1 minute, etc.). By cutting the power periodically, the present invention may provide important advantages such a dampening noise and saving costs, such as operating costs.

The embodiments of the present invention provide important advantages over the conventional devices and methods, for example, by providing an inexpensive and sensorless AC inductive motor control (e.g., AC single-phase or shaded-pole motor) for a household appliance fan that dynamically controls the speed of the fan motor and improves the safety of a household appliance.

In view of the above aspects of the invention, an exemplary embodiment is directed to a method of controlling a fan motor of a household appliance. The method includes cutting a voltage to the fan motor, measuring an electromotive force (EMF) of the fan motor at a predetermined time after the cutting of the voltage to the fan motor, and comparing the measured electromotive force (EMF) to a table.

In an embodiment, the fan motor is an AC inductive motor. The table can be a software table or database. The table can be specific to the fan motor being used. The table can include a threshold value. In an embodiment, the threshold value includes a first threshold for a high speed mode, and wherein the threshold value includes a second threshold for a low speed mode. The threshold value can be based on the household appliance.

In an embodiment, the method includes determining whether the fan motor was running at a time of the cutting of the voltage to the fan motor based on the comparison of the measured electromotive force (EMF) to the table. In an embodiment, the method includes determining a speed of the fan motor at a time of the cutting of the voltage to the fan motor based on the comparison of the measured electromotive force (EMF) to the table. In an embodiment, the method includes determining whether the fan motor is operating below a predetermined or threshold value at a time of the cutting of the voltage to the fan motor based on the comparison of the measured electromotive force (EMF) to the table. In an embodiment, the method includes outputting a first signal indicating that the fan motor is operating properly if the operation of the fan motor is equal to or greater than the predetermined or threshold value. In an embodiment, the method includes outputting a second signal indicating that the fan motor is operating improperly if the operation of the fan motor is less than the predetermined or threshold value. In an embodiment, the first signal is a first Hall effect mimicking signal and the second signal is a second Hall effect mimicking signal. In an embodiment, the household appliance is a cooking appliance. In an embodiment, the method includes sending a signal to cut a voltage to a heating element of the cooking appliance based on the outputting of the second signal. In an embodiment, the method includes sending a signal to terminate a heating cycle of the cooking appliance based on the outputting of the second signal. In an embodiment, the method includes sending a signal to default the fan motor to a high speed setting based on the outputting of the second signal. In an embodiment, the method includes turning the voltage to the fan motor back on. In an embodiment, the voltage is periodically cut and turned back on, and the electromotive force (EMF) is measured during periods when the voltage is cut. In an embodiment, the method includes turning the voltage to the fan motor back on based on the outputting of the first signal. In an embodiment, the method includes setting a timer upon turning the voltage to the fan motor back on, and re-cutting the voltage to the fan motor after the timer has expired. In an embodiment, a microcontroller performs the comparing of the measured electromotive force (EMF) to the table, and the method includes normalizing the measured electromotive force (EMF) of the fan motor to be within an operating range of a microcontroller. In an embodiment, the method includes powering the fan motor in a full-on state to provide a high speed mode, and cutting a leading edge of a power signal to the fan motor to reduce an amount of on-time of the fan motor and provide a low speed mode.

Another exemplary embodiment is directed to a method of controlling a fan motor of a household appliance. The method includes periodically cutting a voltage to the fan motor, measuring an electromotive force (EMF) of the fan motor at a predetermined period of time after the cutting of the voltage to the fan motor, and comparing the measured electromotive force (EMF) to a table to determine if the fan motor is operating properly. If the fan motor is determined to be operating properly, the method includes outputting a first signal and turning the voltage to the fan motor back on. If the fan motor is determined to be operating improperly, the method includes outputting a second signal, and one of cutting a voltage to a heating element of the household appliance and setting the fan motor to a high speed setting.

Another exemplary embodiment is directed to a household appliance including a sensorless fan speed controller. The household appliance includes a housing having an interior cavity, a fan, a fan motor rotatably coupled to the fan, and a fan controller that monitors operation of the fan based on electromotive force (EMF) conditions of the fan motor.

In an embodiment, the fan motor is an AC inductive motor. In an embodiment, the fan controller cuts a voltage to the fan motor, measures an electromotive force (EMF) of the fan motor during a motor off time, and compares the measured electromotive force (EMF) to a table. In an embodiment, the fan controller includes a speed sensing module that measures the electromotive force (EMF) of the fan motor, a microcontroller that receives the measured electromotive force (EMF) from the speed sensing module and compares the measured electromotive force (EMF) to a table. In an embodiment, the table is a software table or database. In an embodiment, the method includes the speed sensing module normalizes the measured electromotive force (EMF) of the fan motor to be within an operating range of the microcontroller. In an embodiment, the method includes the fan controller determines whether the fan motor was running based on the electromotive force (EMF) conditions of the fan motor. In an embodiment, the method includes the fan controller determines a speed of the fan motor based on the electromotive force (EMF) conditions of the fan motor. In an embodiment, the method includes the fan controller determines whether the fan motor was operating below a predetermined or threshold value based on the electromotive force (EMF) conditions of the fan motor. In an embodiment, the method includes the fan controller outputs a first signal indicating that the fan motor is operating properly if the electromotive force (EMF) conditions of the fan motor are equal to or greater than a predetermined or threshold value. In an embodiment, the method includes the fan controller outputs a second signal indicating that the fan motor is operating improperly if the electromotive force (EMF) conditions of the fan motor are less than a predetermined or threshold value. In an embodiment, the method includes the household appliance is a cooking appliance. In an embodiment, the method includes the AC inductive motor is a two-speed AC inductive motor.

The features of the invention, however, together with additional objects and advantages thereof will be best understood from the following description of exemplary embodiments when read in connection with the accompanying drawings.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

With reference to FIGS. 1-13, exemplary embodiments of the invention will now be described.

Figure 1:
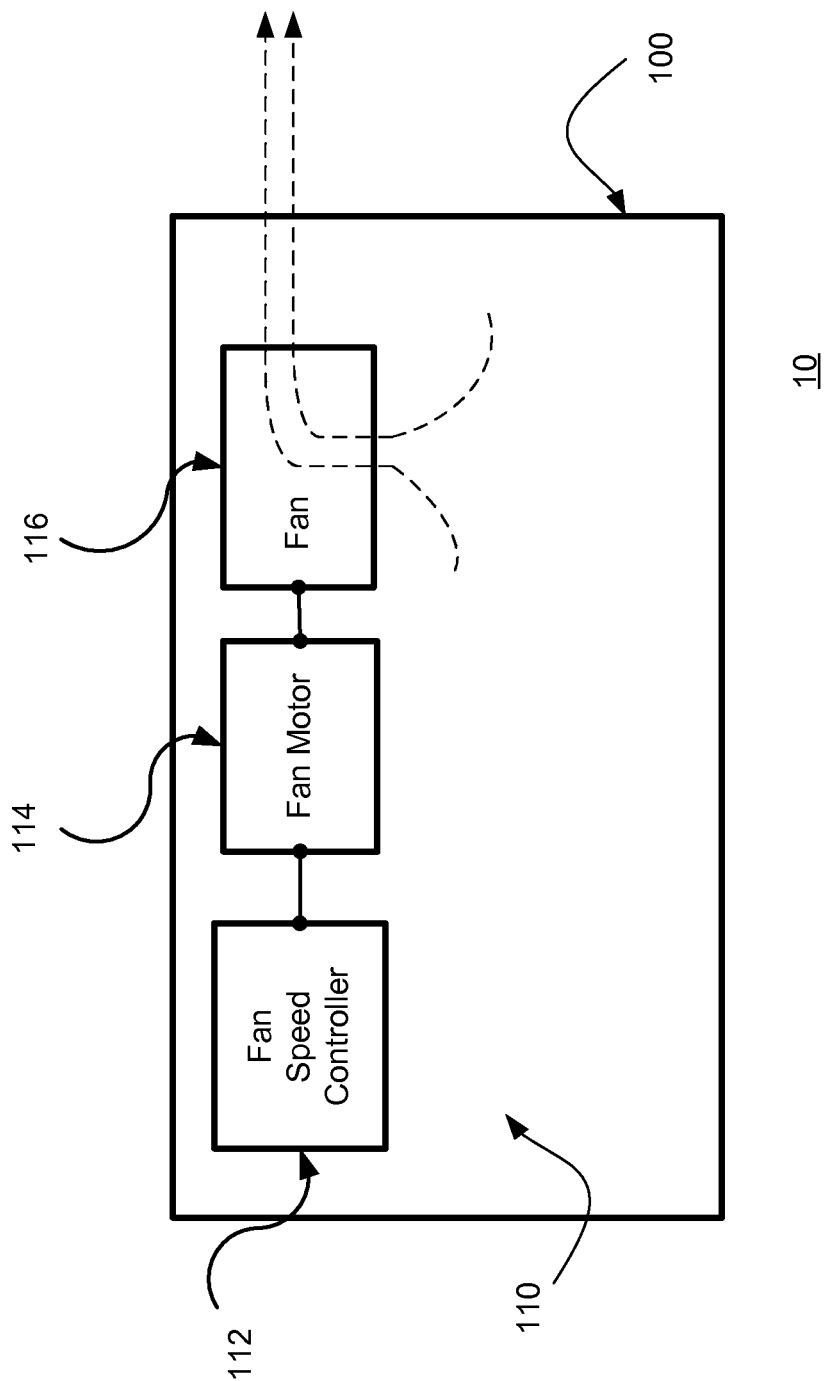
FIG. 1 is a schematic illustrating a household appliance including a fan speed controller according to an embodiment of the invention.

FIG. 1 illustrates an embodiment of a household appliance 10 having a housing 100 with an interior cavity 110. The household appliance 10 includes a fan speed controller 112. The fan speed controller 112 communicates with a fan motor 114 that is rotatably coupled to a fan 116, which has fan blades or impellers. The fan speed controller drives the fan 116.

The fan 116 may circulate air within the interior cavity 110 of the household appliance 10, exhaust air from the interior cavity 110 to the exterior of the household appliance 10, or draw air into the interior cavity 110 from the exterior of the household appliance 10. The fan 116 may be a circulation fan, an exhaust fan, a ventilation fan, or a cooling fan.

The fan motor 114 according to an embodiment may be an AC inductive motor (i.e., AC shaded-pole or single-phase motor). The fan speed controller 112 communicates with the fan motor 114. The fan speed controller 112 may include a microcontroller for controlling the fan speed of the fan motor 114. One of ordinary skill in the art will recognize that any suitable microcontroller may be utilized to provide the functionality described herein.

The fan speed controller 112 can provide real time motor speed control and detection using the inherent EMF properties of an AC inductive motor to provide a fully sensorless motor control. The speed detection is performed using the electromotive force (EMF) conditions within the fan motor 114. More particularly, the speed detection is performed by measuring the EMF conditions within the fan motor 114 during motor OFF times.

Embodiments of the household appliance 10 may include a cooking appliance, such as a built-in wall oven, a cooktop, a range/oven, a convection oven, a refrigerator, a freezer, or a microwave cooking appliance. The embodiments are not limited to a cooking appliance or a refrigeration appliance and may include any household appliance having a fan, including but not limited to a space heater, a vent fan, a cabinet cooling fan for a computer, or a bathroom vent/exhaust fan. The embodiments also are applicable to other household appliances having a motor or a motor for a pulley drive, such as a washer or dryer. For example, the embodiments may be used to sense the motor speed for a pulley drive. The embodiments also are not limited to household appliances having an interior cavity, and may include household appliances without an enclosed interior cavity, such as an exhaust hood that draws air into an inlet and exhausts air out an outlet to the exterior.

Figure 2:
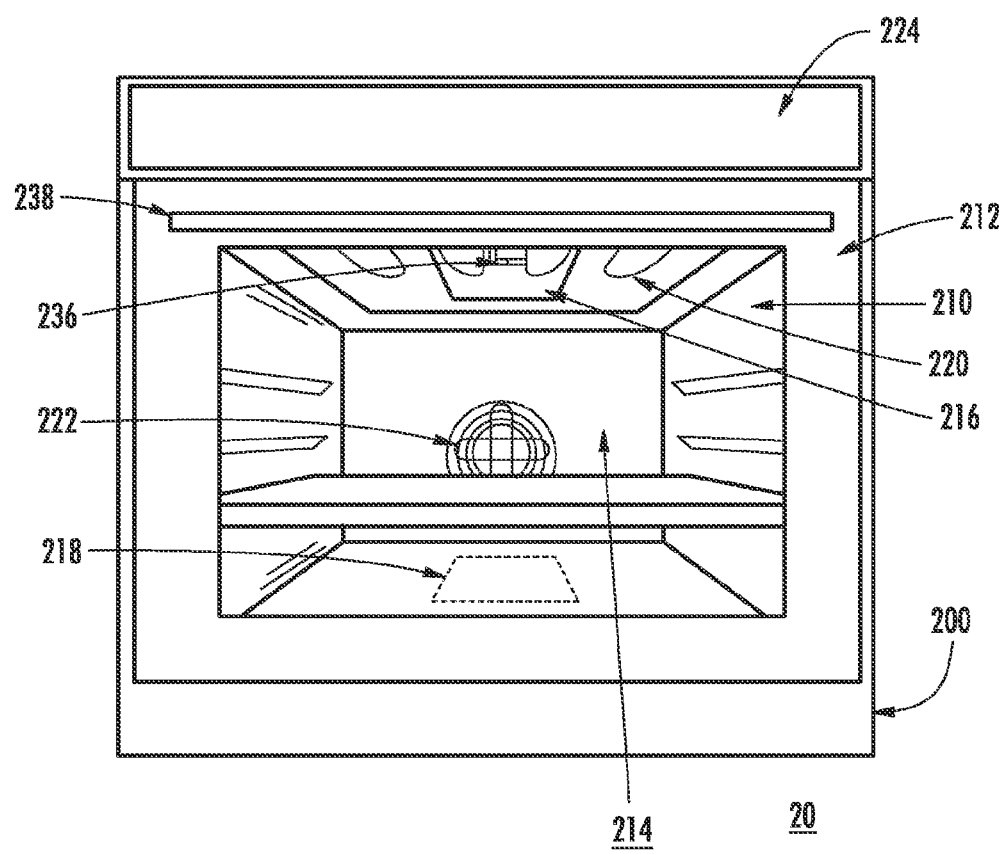
FIG. 2 is a schematic illustrating a household cooking appliance including a fan speed controller according to an embodiment of the invention.
Figure 3:
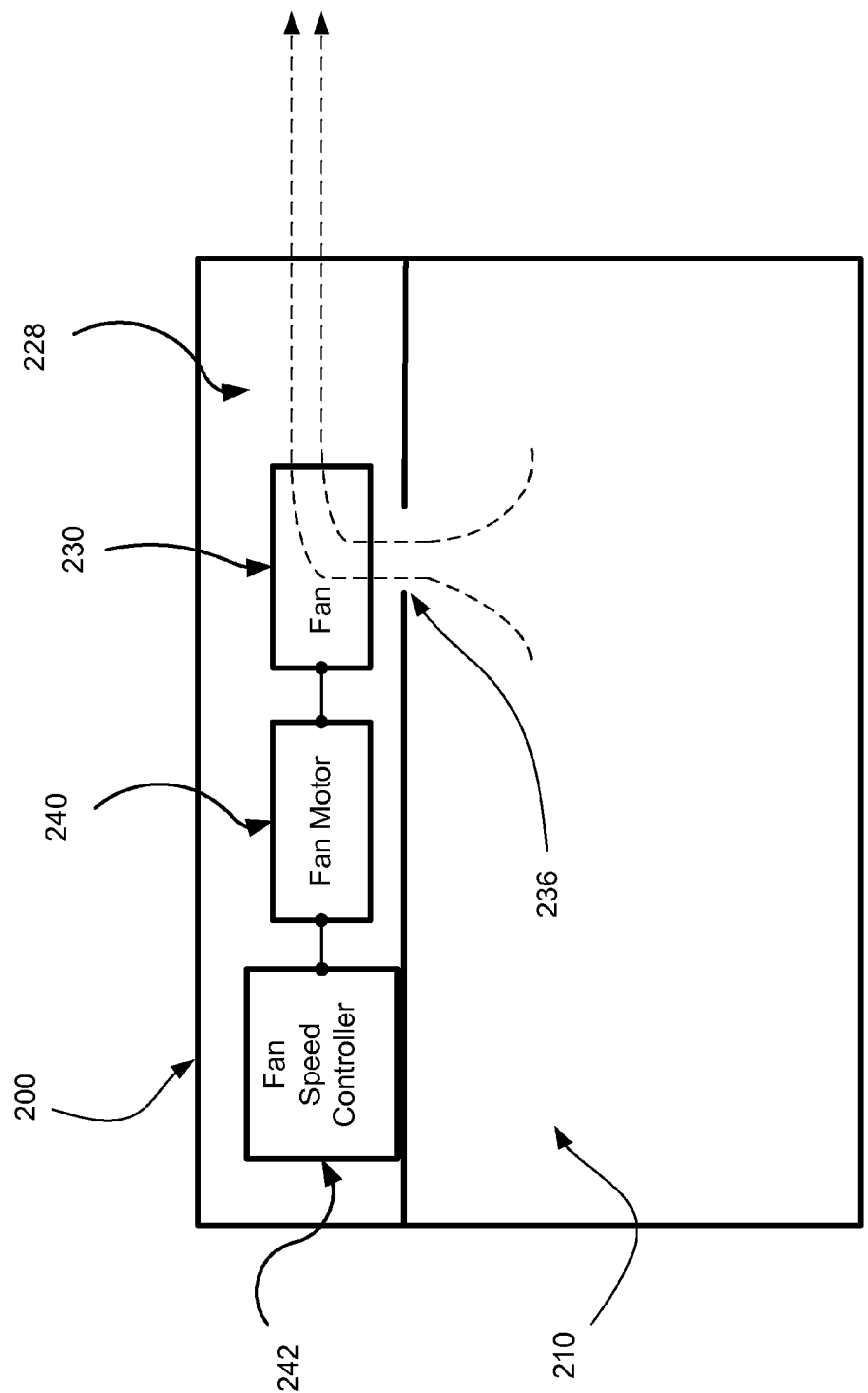
FIG. 3 is another schematic illustrating the household appliance shown in FIG. 2.

With reference to FIGS. 2 and 3, an exemplary embodiment of a household appliance, such as a cooking appliance 20 (e.g., a domestic wall oven), will now be described.

As shown in FIG. 2, the cooking appliance 20 includes a baking oven housing 200, in which a cooking area 210 is arranged. The cooking area 210 can be sealed with a swivel-mounted door 212 having a door handle 238. The cooking area 210 can be heated with a heating unit 214, which may have a heating element 216 in the top region for top heating, a heating element 218 in the floor region for bottom heating, and a heating spiral 220 for grilling in the top region. The cooking appliance 20 has a control panel 224 with one or more control elements for setting temperatures of one or more of the heating elements, setting different types of cooking modes, and/or timing the cooking operation, etc. The cooking appliance 20 may include a circulating fan 222 in the rear region of the cooking area 210 for generating an air current for a circulating mode.

With reference to FIG. 3, the cooking appliance 20 may include a cooling fan or exhaust fan 230, which has fan blades or impellers. In the embodiment, the cooling fan 230 is rotatably coupled to an electrically operated fan motor 240. The cooling fan 230 may be arranged outside of the cooking area 210 and in communication with a cavity 228 of the baking oven housing 200. The cooling fan 230 may be located at a variety of locations depending on the design of the appliance. For example, the cooling fan 230 may be located above the cooking area, at the rear side of the appliance, and/or in the cavity 228. The purpose of the cooling fan 230 may be to convey air out of the cooking area 210 to the exterior of the cooking appliance 20. To this end, the cooling fan 230 suctions air through an opening 236 in the top region of the cooking area 210 and conveys the air through a channel system (not shown in detail) to a blower aperture (not shown) in the baking oven housing 200 or in the swivel-mounted door 212. The blower aperture may exhaust directly to the exterior of the cooking appliance 20 or to an exhaust duct for channeling air to another location, such as an exterior of a home.

As shown in FIG. 3, the cooling fan 230 is rotatably coupled to a fan motor 240, which communicates with a fan speed controller 242. In an embodiment, the circulating fan 222 also may be rotatably coupled to a fan motor that communicates with a fan speed controller.

With reference to FIGS. 1-4, an exemplary method of controlling an AC inductive fan motor according to an embodiment of the invention will now be described. As explained above, the exemplary fan speed controller 112, 242 can provide real time motor speed control and detection using the inherent EMF properties of an AC inductive motor (e.g., 114, 240) to provide a fully sensorless motor control.

Figure 4:
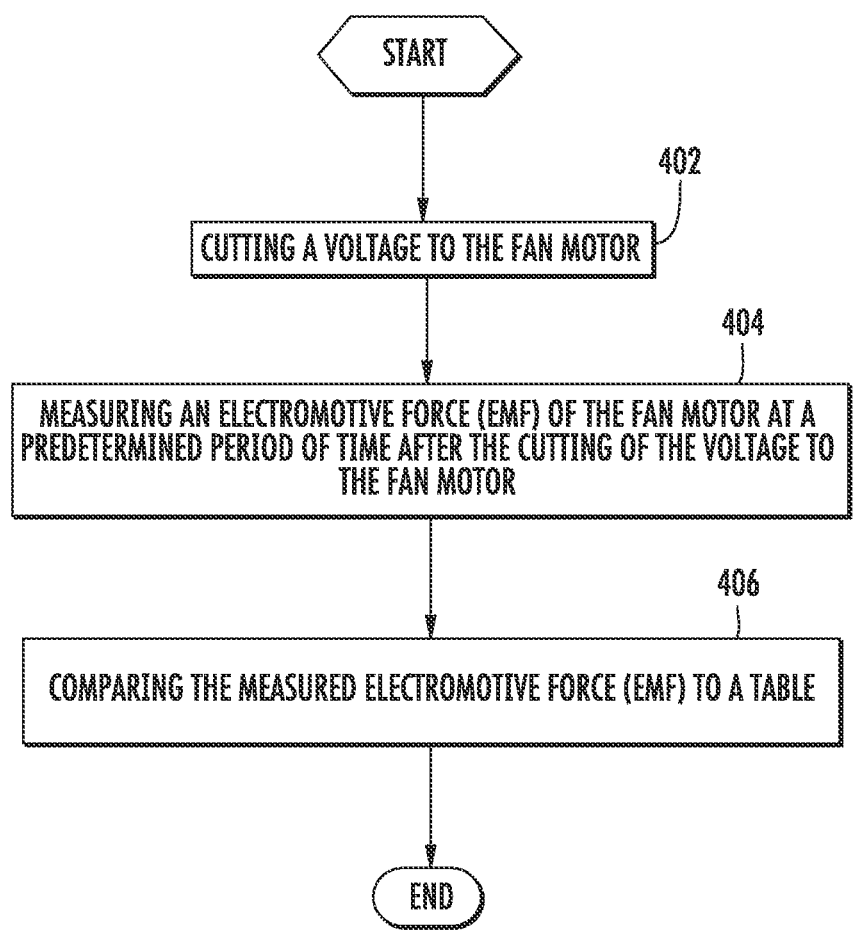
FIG. 4 is a flow diagram illustrating a method of controlling a household appliance fan according to an embodiment of the invention.

As shown in FIG. 4, the fan speed control method includes cutting a voltage to the fan motor (402). In an embodiment, the fan motor is an AC inductive motor. Next, the method includes measuring an electromotive force (EMF) (e.g., an amplitude of the EMF) of the fan motor at a predetermined period of time after cutting the voltage to the fan motor (404). The predetermined amount of time after cutting the voltage to the fan motor may be based on one or more factors. For example, the amount of time may be based on the time needed for inductive oscillations to dampen after the voltage to the motor is cut. The amount of time may be based on the speed setting of the motor (e.g., low speed or high speed) at the time the voltage to the motor is cut. The EMF may be measured or captured at a predetermined time that provides the greatest EMF (i.e., the strongest or 'best' time point, or the point with the greatest rate of change of EMF) for the particular fan being used. Since the EMF may vary based on the fan, the amount of time may be based on the particular motor or fan being used. One of ordinary skill in the art will recognize that one or more of the aforementioned factors, as well as other factors, may be taken into consideration in determining the predetermined amount of time to be used.

Figure 6:
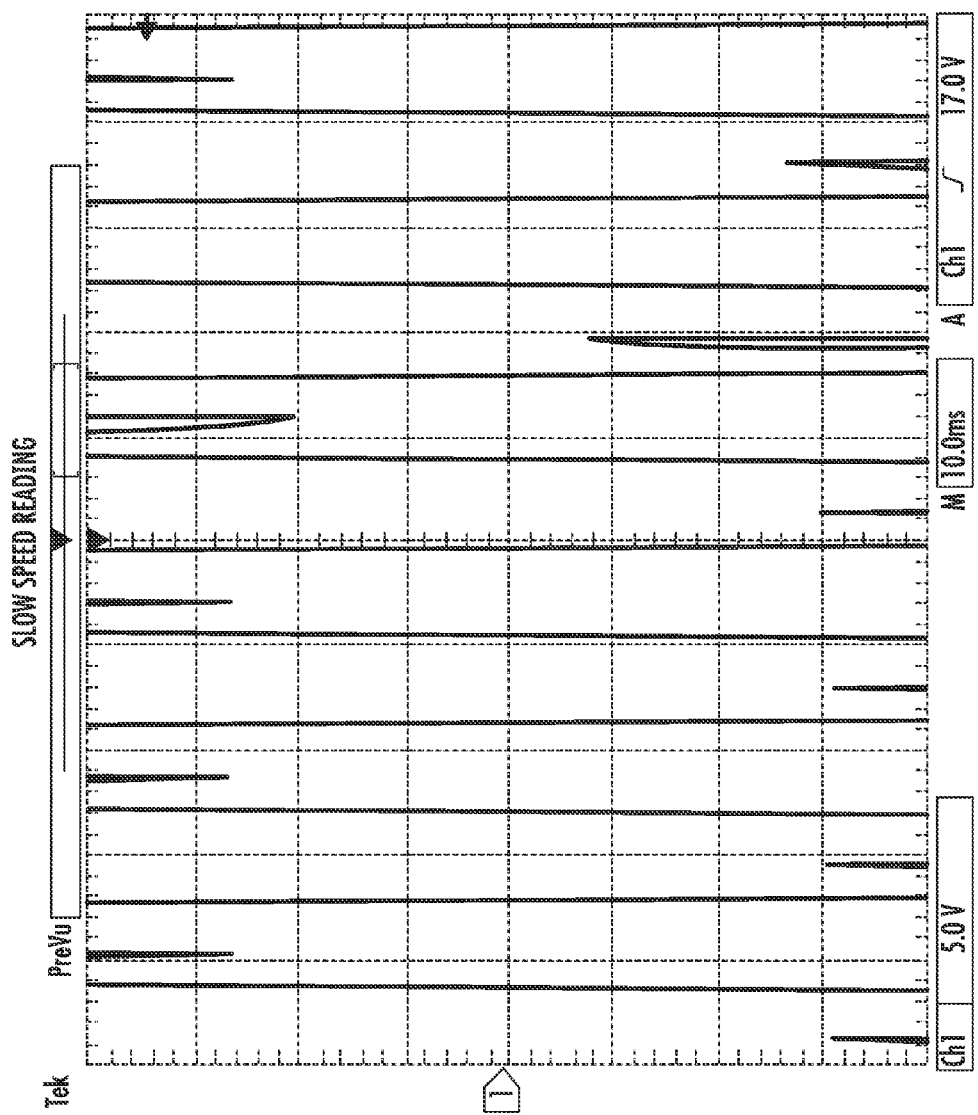
FIG. 6 is a screen shot illustrating a slow speed reading according to an embodiment of the invention.

For example, as shown in FIG. 6, which will be described in greater detail below, the greatest rate of change or difference in EMF occurs in the first 4 ms for the particular fan in this example. Thus, in this example, for an AC inductive motor being operated at 120 V, the predetermined time may be selected to cut the voltage to the fan motor for a short period of time, such as 4 ms. In an exemplary embodiment, the method senses the line crossing and then physically cuts the power to the fan motor at an interval, such as 3.5 ms or 4 ms of OFF time, takes an EMF reading or measurement, and then turns the voltage to the fan motor back on.

Referring again to FIG. 4, the measured EMF is then compared to a table (406). In an embodiment, the comparison of the EMF to the table can be used to determine the speed of the motor at the time the voltage to the fan motor was cut off. In another embodiment, the comparison can be used to evaluate whether the speed of the motor was less than a predetermined or threshold value (e.g., a minimum value) at the time the voltage to the fan motor was cut off. In another embodiment, the comparison can be used simply to determine whether the motor was running or operating at the time the voltage to the fan motor was cut off. The embodiments provide important advantages in that the EMF conditions can provide adequate speed sensing and control for application to household appliances.

The table may be a look-up table, such as a software look-up table, a database, etc. The table may be based on one or more factors, such as the particular fan motor being used, the particular fan or type of fan being used, or the particular application of the fan, among other things. In an embodiment, the look-up table may include one or more threshold values. For example, the look-up table may include a minimum threshold speed at which the fan is capable of satisfying the operating requirements of the household appliance. The minimum speed can be, for example, the speed at which the fan properly or safely moves a volume of air within, from, or into the household appliance. In another embodiment, the threshold values may be based on an operating mode of the fan. For example, the look-up table may include a first threshold for a high speed mode, and/or a second threshold for a low speed mode. In other embodiments, the threshold value may be based on the household appliance or the type of household appliance, or the air flow or the air speed requirements for proper operation of the household appliance or a particular cycle of a household appliance.

Figure 5:
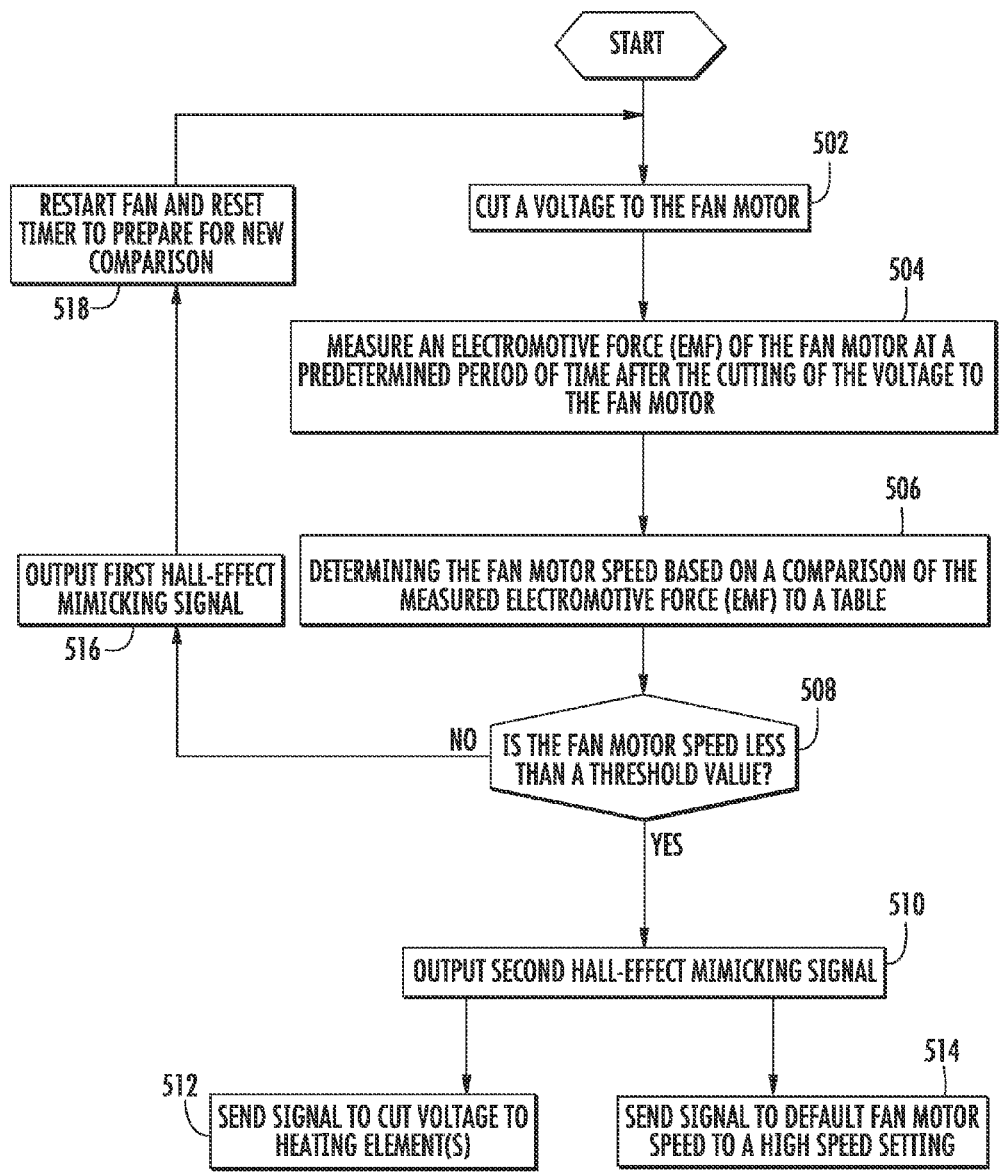
FIG. 5 is a flow diagram illustrating a method of controlling a household appliance fan according to an embodiment of the invention.

With reference to FIG. 5, an exemplary method of controlling an AC inductive fan motor of an appliance, such as a cooking appliance, will now be described. As explained above, the exemplary fan speed controller can provide real time motor speed control and detection using the inherent EMF properties of an AC inductive motor to provide a fully sensorless motor control, for example, for a cooking appliance.

As shown in FIG. 5, the method includes cutting the voltage to the fan motor (502). The method includes measuring an electromotive force (EMF) of the fan motor at a predetermined period of time after the cutting of the voltage to the fan motor (504). The measured EMF then can be compared to a look-up table to determine whether the fan or fan motor is operating below one or more predetermined or threshold speeds (508). The method can include outputting a first signal indicating that the fan motor is operating properly if the speed of the fan motor is equal to or greater than the threshold value (516). The method also can include outputting a second signal indicating that the fan motor is not operating properly if the speed of the fan motor is less than a threshold value (510).

The output of the exemplary sensorless fan speed controller can be based on the specific system in which the sensorless fan speed controller is implemented. That is, the embodiments can provide a sensorless fan speed controller that outputs a mimicking signal that mimics a particular signal that the conventional system expects to receive, such as a square output that mimics a signal of a Hall effect sensor that indicates the particular fan speed. As an example, if the conventional system expects to receive an output from a Hall effect sensor, the embodiments can provide a 'black box' control solution that outputs a Hall effect mimicking signal. If the speed readings are within expected limits, then the microcontroller can output a 50% duty cycle square wave where f=expected Hall frequency. If the speed readings are not within expected limits, then the Hall effect mimicking signal can go low to communicate the error. The exemplary embodiments can provide a so-called 'black box' fan speed controller that easily interfaces with the conventional systems of a household appliance with minimal or no modifications to these conventional systems. The embodiments can provide an important advantage of saving costs while minimizing or avoiding a need for modifying the conventional systems that interface with the novel fan speed controller.

In the embodiment of FIG. 5, the first signal is a first Hall effect mimicking signal (516). For example, the first Hall effect mimicking signal can be a 50% duty cycle square wave having a frequency ranging from 24 Hz to 26 Hz. Similarly, the second signal is a second Hall effect mimicking signal, for example, in which the signal goes low to communicate the error in fan operation (510). In other embodiments, the first Hall effect mimicking signal can be a HIGH signal or the like, and the second Hall effect mimicking signal can be a LOW signal or the like, or vice versa.

The embodiments also may provide periodic motor control, which may reduce operating costs, instead of controlling the motor at every point in time, as in the conventional designs. For example, as shown in FIG. 5, if the first Hall effect mimicking signal is output (516), the method can include restarting the fan (i.e., turning the voltage to the fan motor back on) and/or resetting a timer to prepare for a new comparison (518). The embodiments can provide periodic motor control by cutting the power to the motor (i.e., 502 in FIG. 5) periodically (e.g., every 20 seconds, 30 seconds, 1 minute, etc.). Each time the voltage to the fan motor is cut off (502), a timer can be reset (518) so that the voltage is cut off periodically for taking the EMF measurements. The time period for periodically cutting of the voltage can be based on one or more factors, such as the particular application of the fan or the type of household appliance. Other factors also may be considered. By cutting the power periodically, the present invention may provide important advantages such as reducing or dampening a volume of noise associated with the operation of the appliance and saving costs.

As shown in FIG. 5, if the second Hall effect mimicking signal is output (510), the method may send a signal to terminate a heating cycle (e.g., a cooking cycle or self-cleaning cycle) of the cooking appliance (512). Additionally or alternatively, if the second Hall effect mimicking signal is output (510), the method may send a signal to cause the fan motor to default to a high speed setting, for example, to maximize air flow and improve safety (514).

As explained above, the look-up table may include one or more threshold values that are based on an operating mode of the fan. For example, the look-up table may include a first threshold for a high speed mode, and/or a second threshold for a low speed mode. With reference again to FIGS. 1-3, the fan speed controller 112, 242 may control the operation of the AC inductive fan motor 114, 240 such that two fan speed settings may be provided. For example, a high fan speed setting may be provided by powering the fan motor 114, 240 in a full power or all-on state. A low speed may be provided by cutting the leading edge of the power signal to the fan motor 114, 240 to reduce an amount of on-time of the fan motor 114, 240, thereby slowing the speed of the fan motor 114, 240. The low speed operation may be similar to the operation of a dimmer switch. One of ordinary skill in the art will recognize that this type of operation is not commonly used for controlling AC inductive motors.

For low speed operation, the OFF time of the fan motor may be extended by an appropriate amount of time (e.g., a predetermined amount of time) to provide sufficient EMF signal settling time. For high speed detection, a minimal synchronized delay may be sufficient to allow for sufficient EMF signal settling time. The OFF time may be selected to avoid sudden "jerks" in the fan speed that may result in customer dissatisfaction, for example, due to fan noise. The OFF time can be selected to minimize or eliminate any sound change that may be perceived by the user of the household appliance.

Referring again to FIGS. 2 and 3, the household appliance may be a cooking appliance, such as a built-in wall oven. In this embodiment, or similar embodiments, the high speed setting or the low speed setting of the controller may be dependent on an input from an oven control system (e.g., 224). Therefore, an embodiment can provide a fan speed motor controller that acts as a 'black box' to the oven control system. For example, the built-in wall oven control system may employ two relays in an XOR relationship. This configuration commonly is designed for a conventional two winding fan to provide power to the individual windings. The exemplary fan speed motor controller provides an important advantage in that the fan speed motor acts as a 'black box' to the oven control system such that the available 120V relay switching can be used for performing the speed selection.

With reference to FIG. 6, an example of controlling an AC inductive motor operating at a slow speed mode, according to an embodiment of the invention, will now be described. As shown in the screen shot of FIG. 6, the low speed may be provided by cutting the leading edge of the power signal to the fan motor to reduce an amount of ON time of the fan motor, thereby slowing the speed of the fan motor. The exemplary method senses the line crossing (i.e., the voltage crossing the zero line) and then physically cuts the power to the fan motor. The method takes an EMF reading or measurement approximately 4 ms after the voltage is cut and then turns the voltage to the fan motor back on. As shown in the embodiment of FIG. 6, the EMF reading for this example is approximately 10 V at a point of time approximately 4 ms after the voltage is cut.

Figure 7:
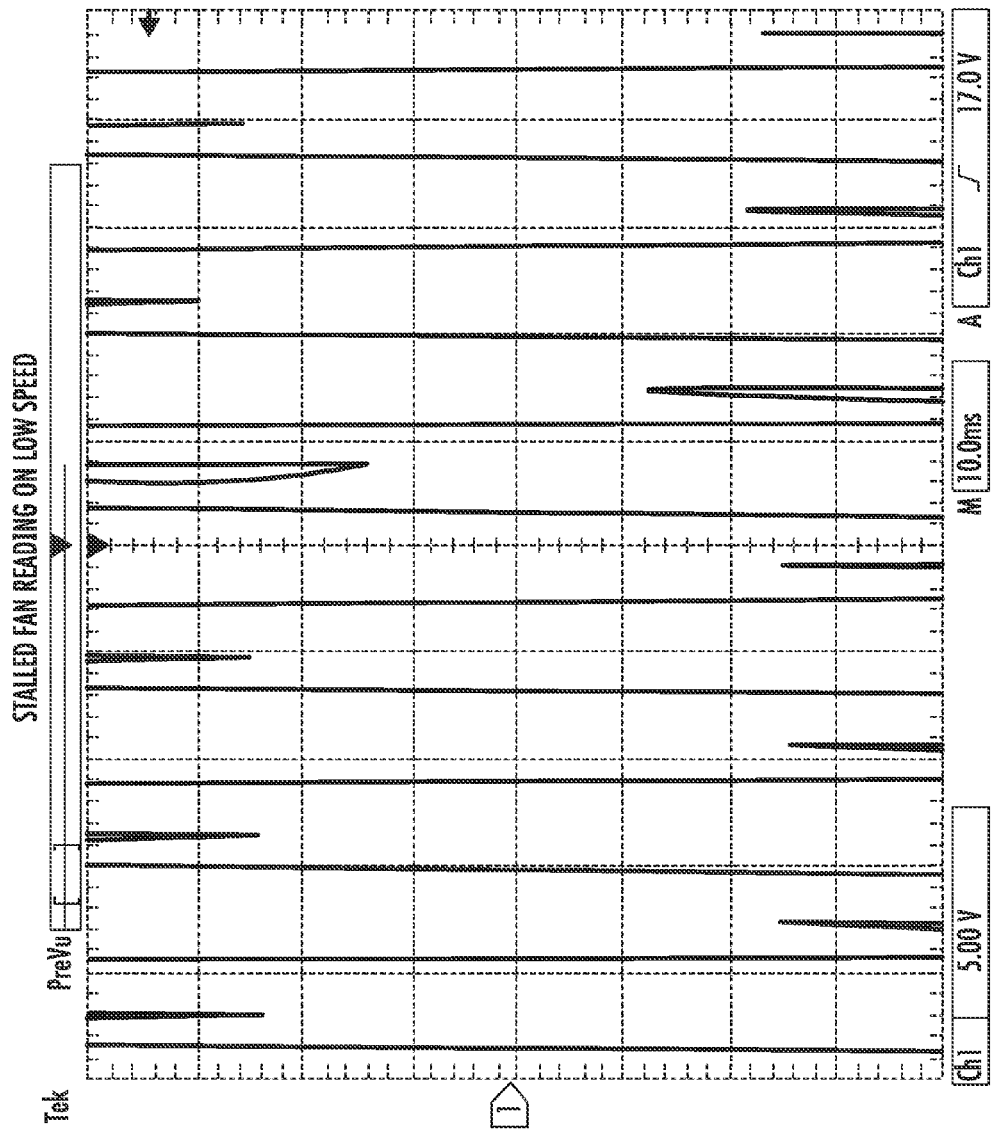
FIG. 7 is a screen shot illustrating a stalled fan reading on low speed according to an embodiment of the invention.

With reference to FIG. 7, an example of controlling an AC inductive motor operating at a slow speed mode in which the fan is stalled, according to an embodiment of the invention, will now be described. As shown in the screen shot of FIG. 7, the exemplary method senses the line crossing (i.e., the voltage crossing the zero line) and then physically cuts the power to the fan motor. The method takes an EMF reading or measurement approximately 4 ms after the voltage is cut and then turns the voltage to the fan motor back on. As shown in the embodiment of FIG. 7, the EMF reading for this example is approximately 7.5 V at a point of time approximately 4 ms after the voltage is cut.

Figure 8:
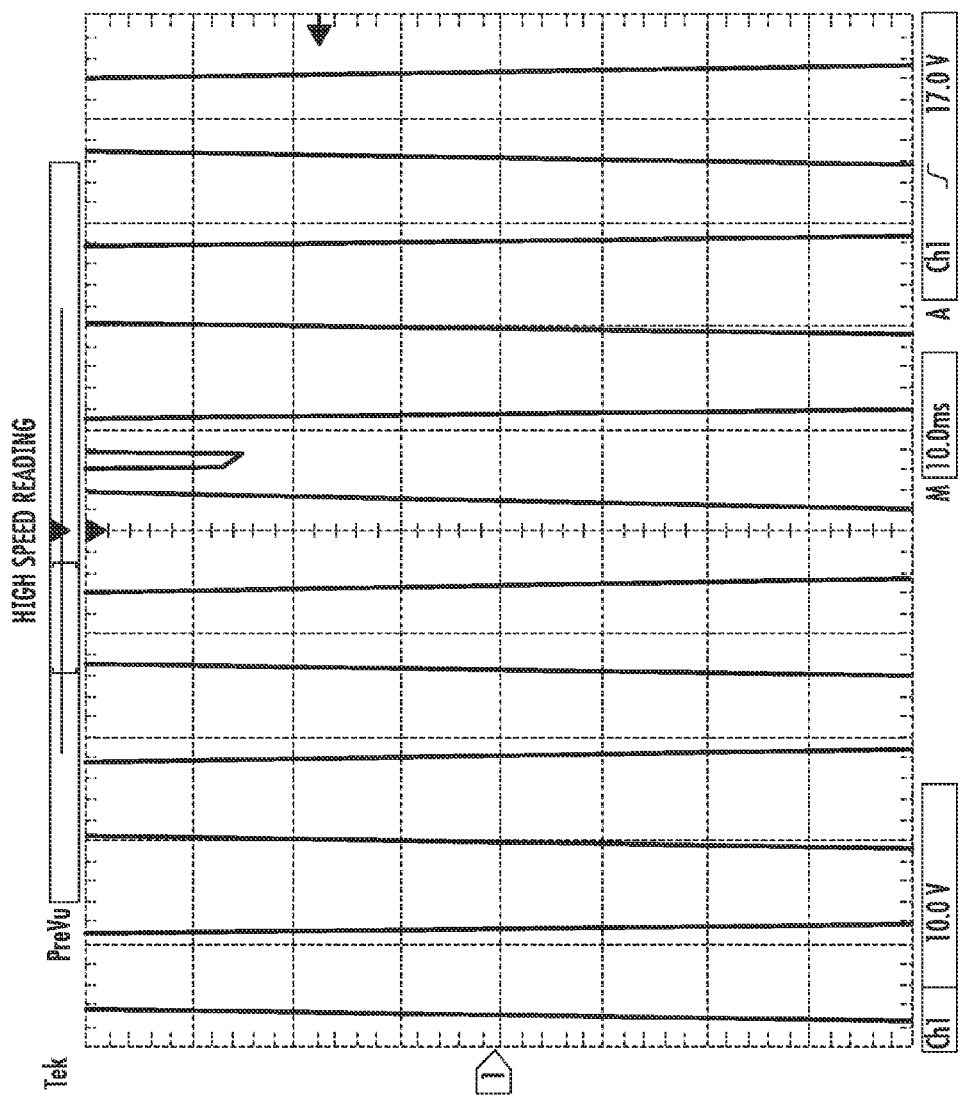
FIG. 8 is a screen shot illustrating a high speed reading according to an embodiment of the invention.

With reference to FIG. 8, an example of controlling an AC inductive motor operating at a high speed mode, according to an embodiment of the invention, will now be described. As shown in the screen shot of FIG. 8, the high fan speed setting may be provided by powering the fan motor in a full power or all-on state. The exemplary method senses the line crossing (i.e., the voltage crossing the zero line) and then physically cuts the power to the fan motor. The method takes an EMF reading or measurement approximately 4 ms after the voltage is cut and then turns the voltage to the fan motor back on. As shown in the embodiment of FIG. 8, the EMF reading for this example is approximately 25 V at a point of time approximately 4 ms after the voltage is cut.

Figure 9:
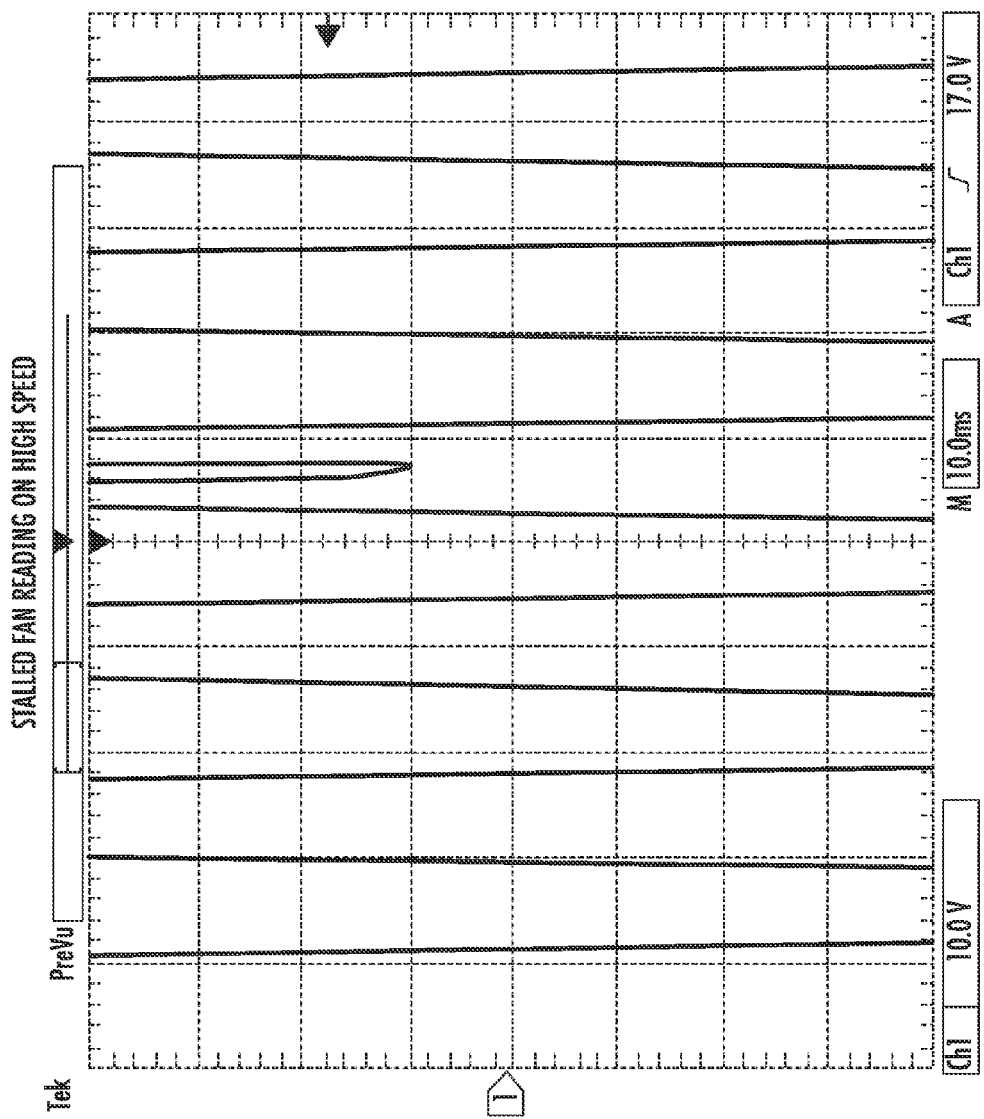
FIG. 9 is a screen shot illustrating a stalled fan reading on high speed according to an embodiment of the invention.

With reference to FIG. 9, an example of controlling an AC inductive motor operating at a high speed mode in which the fan is stalled, according to an embodiment of the invention, will now be described. As shown in the screen shot of FIG. 9, the exemplary method senses the line crossing (i.e., the voltage crossing the zero line) and then physically cuts the power to the fan motor. The method takes an EMF reading or measurement approximately 4 ms after the voltage is cut and then turns the voltage to the fan motor back on. As shown in the embodiment of FIG. 9, the EMF reading is approximately 10 V at a point of time approximately 4 ms after the voltage is cut.

Figure 10:
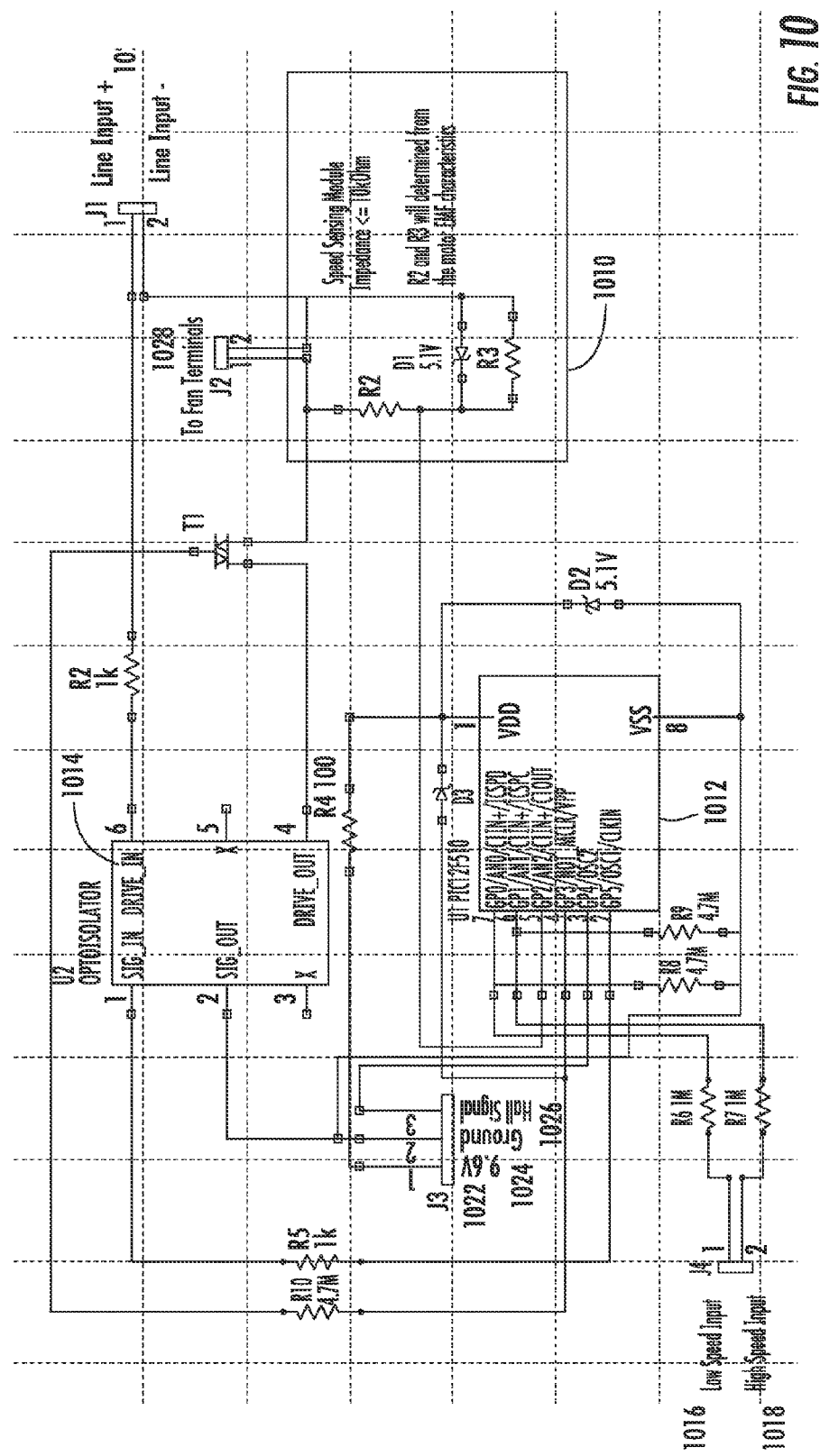
FIG. 10 is a schematic of a fan speed controller according to an embodiment of the invention.

With reference to FIG. 10, a schematic illustrating an exemplary embodiment of a fan speed controller will now be described. One of ordinary skill in the art will recognize that other arrangements of a fan speed controller, or means for performing the functionality of the fan speed controller described herein, can be implemented within the spirit and scope of the invention. The invention is not intended to be limited to the exemplary implementation shown in FIG. 10.

As shown in FIG. 10, the fan speed controller can include a low speed input 1016 and a high speed input 1018. The exemplary fan speed controller has a 120 V line input 1020, which may depend on the design, a 9.6 V input 1022, and a ground 1024. The exemplary fan speed controller has a Hall-signal output 1026 and a fan power output 1028. The embodiment of FIG. 10 includes a TRIAC (T1) 1030 coupled between an optoisolator 1014, the 120 V line input (power) and the fan power output 1028 (load).

As shown in FIG. 10, the fan speed controller includes a microcontroller 1012 and a speed sensing module 1010. The speed sensing module 1010 sends the measured EMF to the microcontroller 1012 for comparison with a look-up table (e.g., software look-up table).

In an embodiment, the measured EMF may be normalized to be within an operating range of the microcontroller 1012. That is, the EMF voltage can be normalized to solid state levels that can be read by the particular microcontroller and then sent to the microcontroller for comparison with the look-up table. For example, the resultant voltage magnitude of the measured EMF can be normalized to be within a 0 V to Vdd operating range of the microcontroller 1012. The speed sensing module 1010 reads a 25 V signal and normalizes the signal to 4.8 V so that the voltage signal can be read on a 5 V microcontroller 1012. The normalized voltage magnitude is then identified by the microcontroller 1012 and referenced to a software table to determine if the signal is outside the acceptable range of the fan and the fan is operating at an incorrect speed.

As shown in FIG. 10, an embodiment of the speed sensing module 1010 may include a flyback diode D1 to control inductive spiking. If the voltage spikes, the flashback diode D1 takes the flyback voltage and gives it a path to go away, which provides an important advantage of taking away or reducing the heat in the motor windings.

In an embodiment, the timing for the outputs of the microcontroller (e.g., 1012) may be derived directly from the power line crossings. To simplify the interface, an embodiment feeds the power line input through a >2.5 MΩ resistor. The internal microcontroller circuitry then sinks low voltage to ground and high voltage to Vdd, essentially creating a line crossing input signal.

One of ordinary skill in the art will recognize that other methods for synchronizing timing with the line source may be applied, and the embodiments are not limited to the example provided. For example, in an embodiment, the voltage to the fan motor may be cut at the zero line crossing (i.e., where waveform crosses the x-axis). In another embodiment, the timing scheme may be changed to measure the EMF at the peak of the waveform. That is, the voltage to the fan motor may be cut at the peak of the waveform, instead of the zero line crossing. In this embodiment, the line crossing may be sensed and the time to the peak of the waveform may be calculated based on the frequency. The embodiment may then measure the EMF at the peak of the waveform. As an example, if the frequency is 60 Hz, the signal is high for approximately 8.3 ms and low for approximately 8.3 ms. The peak is half of the high or low value, or approximately 4.17 ms. Accordingly, in this example, the voltage may be cut approximately 4.17 ms after the zero (0) line crossing. The EMF reading then can be taken after a predetermined amount of time (e.g., 4 ms following the cutting of the voltage, or 8.17 ms after the zero (0) line crossing), and then the voltage can be turned back on. The EMF reading can then be compared to a look-up table.

Figure 11:
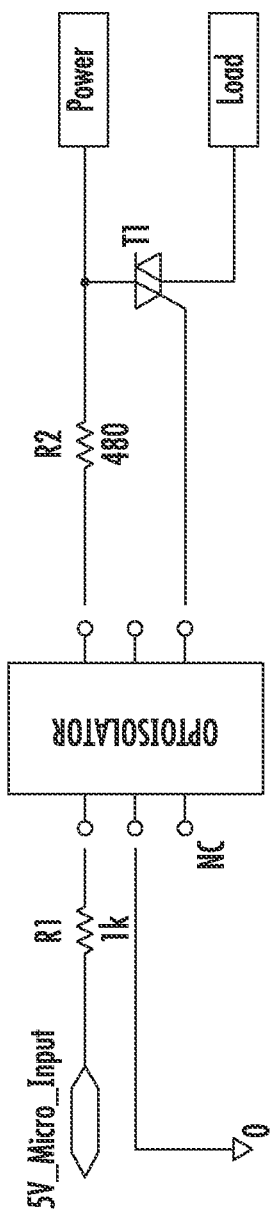
FIG. 11 is a schematic of a TRIAC control circuit according to an embodiment of the invention.
Figure 12:
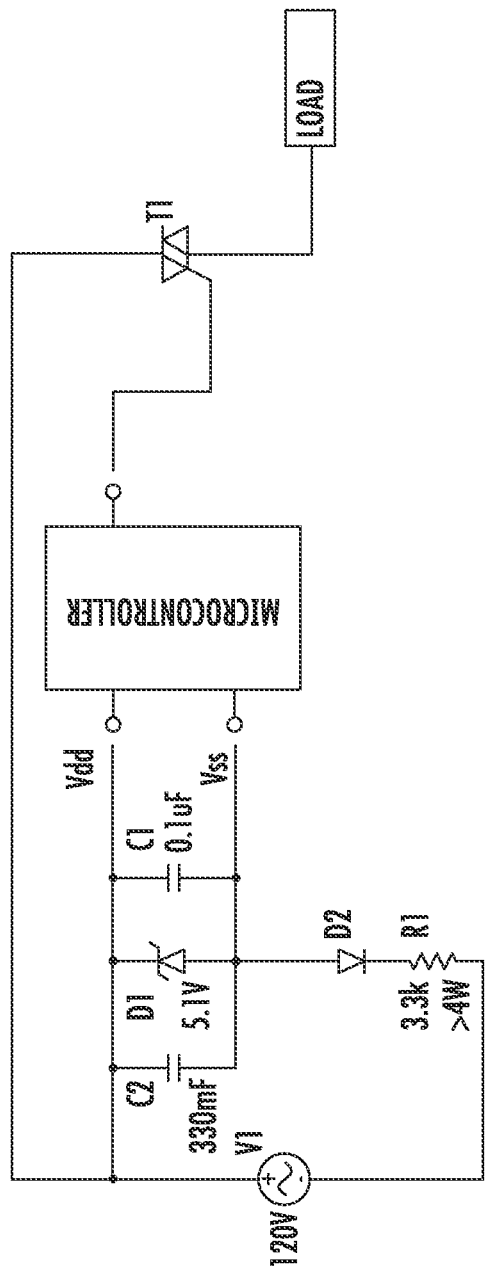
FIG. 12 is a schematic of a TRIAC control circuit according to an embodiment of the invention.

With reference to FIGS. 11 and 12, exemplary embodiments for controlling the fan speed of a fan motor, such as fan motor 114 or 240 in FIGS. 1 and 3, will now be described. As shown in FIGS. 11 and 12, the fan speed may be controlled via a TRIAC T1 (TRIode for Alternating Current) to pulse the power. One of ordinary skill in the art will recognize that the method of controlling the fan speed of the fan motor may be based on cost efficiency and various solutions may be implemented to pulse the power to the fan motor. For example, as illustrated in FIG. 11, the TRIAC T1 may be coupled between an optoisolator, the power source, and the load. As illustrated in FIG. 12, the TRIAC timing may be controlled by a microcontroller. FIG. 12 illustrates an embodiment having a power supply to the microcontroller with trade-offs for component numbers and values. In FIG. 12, no auxiliary power supply may be necessary for microcontroller operation. However, in other embodiments, the oven control system may have, for example, a 9.6 V regulated DC power supply.

Figure 13:
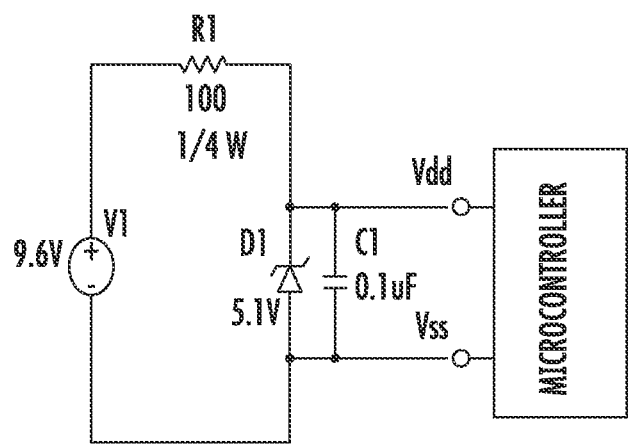
FIG. 13 is a schematic of a power supply circuit according to an embodiment of the invention.

FIG. 13 is a schematic illustrating a two component power supply that may be adequate or suitable for a household appliance, and more particularly, a household cooking appliance, such as a built-in wall oven. One of ordinary skill in the art will recognize that other power supply alternatives may be used.

Exemplary embodiments can provide safeguards for safe and continuous operation of the household appliance. For example, in an embodiment, a watchdog timer may be implemented to prevent unplanned infinite looping or other failures of the microcontroller. Upon timing out, the microcontroller may continue normal operation, if possible. In an embodiment, the system may be configured such that any failure, whether from the fan speed dropping below a minimum threshold or an undetermined failure, defaults the fan to a high speed fan operation. The embodiments may be effective for reducing or preventing problems associated with a runaway situation, for example, in which all elements in a cooking appliance are powered on.

As explained above, the exemplary embodiments of the invention provide an inexpensive and sensorless AC inductive motor control (e.g., AC single-phase or shaded-pole motor) for a household appliance fan that dynamically controls the speed of the fan motor and improves the safety of a household appliance. The exemplary embodiments of the present invention can detect a failure or slowing of the fan below a predetermined or threshold speed. The exemplary embodiments of the invention can provide important advantages in improving the safety of a household appliance by running the fan at a high speed setting and/or turning off the heating elements (e.g., of a cooking appliance) to reduce a build-up of heat in the appliance and/or the surroundings of the appliance. The embodiments of the present invention also can provide a household appliance having a two speed fan motor that is inexpensive and easy to monitor and control.

The embodiments are described in general with respect to a household appliance, and more particularly, to a household cooking appliance. However, one of ordinary skill in the art will recognize that the embodiments are not limited to these examples. For example, the embodiments are applicable to any household appliance having a fan, such as a wall oven, range/oven, convection oven, cooktop, or similar household appliance. The embodiments also are applicable to other household appliances or devices, such as a space heater, an air vent (e.g., exhaust vent or bathroom vent), a cabinet cooling fan for a personal computer, a laptop, a portable computing device, a server cabinet, etc., as well as microwaves, refrigerators, dishwashers, dryers, washing machines, etc. The embodiments also can provide for sensing a motor speed for a pulley drive, for example, in a household appliance, such as a washing machine. The embodiments can provide for sensing a motor speed for a rack and pinion drive or other translational mechanisms or devices.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor or microcontroller such that the processor or microcontroller can read information from, and write information to, the storage medium. In the alternative, the storage medium may be integral to the processor or microcontroller.

Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of providing sensorless control of a fan motor of a household appliance, the method comprising:

cutting a voltage to the fan motor of the household appliance;

measuring an electromotive force (EMF) of the fan motor at a predetermined time after the cutting of the voltage to the fan motor; and comparing the measured electromotive force (EMF) to a table, and based on the comparison to the table, determining one of:

whether the fan motor was running at a time of the cutting of the voltage to the fan motor based on the comparison of the measured electromotive force (EMF) to the table;

a speed of the fan motor at a time of the cutting of the voltage to the fan motor based on the comparison of the measured electromotive force (EMF) to the table; and whether the fan motor is operating below a predetermined or threshold value at a time of the cutting of the voltage to the fan motor based on the comparison of the measured electromotive force (EMF) to the table; and based on the determining, generating, by a microcontroller of the household appliance, a mimicking signal that mimics a Hall effect square wave signal and outputting, by the microcontroller, the mimicking signal that mimics the Hall effect square wave signal.

2. The method according to claim 1, wherein the fan motor is an AC inductive motor.

3. The household appliance according to claim 2, wherein the AC inductive motor is a two-speed AC inductive motor.

4. The method according to claim 1, wherein the table is a software table or database.

5. The method according to claim 1, wherein the table is specific to the fan motor being used.

6. The method according to claim 1, wherein the table includes a threshold value.

7. The method according to claim 6,
wherein the threshold value includes a first threshold for a high speed mode, and
wherein the threshold value includes a second threshold for a low speed mode.

8. The method according to claim 6, wherein the threshold value is based on the household appliance.

9. The method according to claim 1, further comprising:
based on the determining, outputting, by the microcontroller, a first mimicking signal that mimics a first Hall effect square wave signal to the fan motor controller indicating that the fan motor is operating properly if the operation of the fan motor is equal to or greater than the predetermined or threshold value; and
based on the determining, outputting, by the microcontroller, a second mimicking signal that mimics a second Hall effect square wave signal to the fan motor controller indicating that the fan motor is operating improperly if the operation of the fan motor is less than the predetermined or threshold value.

10. The method according to claim 9, wherein the household appliance is a cooking appliance.

11. The method according to claim 9, further comprising one of:
turning the voltage to the fan motor back on based on the outputting of the first mimicking signal that mimics the first Hall effect square wave signal;
sending a signal to cut a voltage to a heating element of the cooking appliance based on the outputting of the second mimicking signal that mimics the second Hall effect square wave signal;
sending a signal to terminate a heating cycle of the cooking appliance based on the outputting of the second mimicking signal that mimics the second Hall effect square wave signal; and
sending a signal to default the fan motor to a high speed setting based on the outputting of the second mimicking signal that mimics the second Hall effect square wave signal.

12. The method according to claim 11, further comprising:
setting a timer upon turning the voltage to the fan motor back on based on the outputting of the first mimicking signal that mimics the first Hall effect square wave signal; and
re-cutting the voltage to the fan motor after the timer has expired.

13. The method according to claim 1, further comprising:
turning the voltage to the fan motor back on.

14. The method according to claim 13,
wherein the voltage is periodically cut and turned back on, and
wherein the electromotive force (EMF) is measured during periods when the voltage is cut.

15. The method according to claim 1,
wherein the microcontroller performs the comparing of the measured electromotive force (EMF) to the table, and
wherein the method includes normalizing the measured electromotive force (EMF) of the fan motor to be within an operating range of the microcontroller.

16. The method according to claim 1, further comprising:
powering the fan motor in a full-on state to provide a high speed mode; and
cutting a leading edge of a power signal to the fan motor to reduce an amount of on-time of the fan motor and provide a low speed mode.

17. A method of controlling a fan motor of a household appliance, the method comprising:
periodically cutting a voltage to the fan motor;
measuring an electromotive force (EMF) of the fan motor at a predetermined period of time after the cutting of the voltage to the fan motor; and
comparing the measured electromotive force (EMF) to a table to determine if the fan motor is operating properly,
wherein, if the fan motor is determined to be operating properly, the method includes, based on the comparing, generating, by a microcontroller of the household appliance, a first mimicking signal that mimics a first Hall effect square wave signal and outputting, by the microcontroller, the first mimicking signal that mimics the first Hall effect square wave signal indicating that the fan motor is operating properly if the operation of the fan motor is equal to or greater than the predetermined or threshold value; and
based on the comparing, generating, by the microcontroller, a second mimicking signal that mimics a second Hall effect square wave signal and outputting, by the microcontroller, the second mimicking signal that mimics the second Hall effect square wave signal indicating that the fan motor is operating improperly if the operation of the fan motor is less than the predetermined or threshold value.

18. A household appliance including a sensorless fan speed controller, the household appliance comprising:
a housing having an interior cavity;
a fan;
a fan motor rotatably coupled to the fan;
a sensorless fan controller that monitors operation of the fan based on electromotive force (EMF) conditions of the fan motor; and
a microcontroller,
wherein the sensorless fan controller monitors operation of the fan by:
cutting a voltage to the fan motor of the household appliance;

measuring an electromotive force (EMF) of the fan motor at a predetermined time after the cutting of the voltage to the fan motor; and comparing the measured electromotive force (EMF) to a table, and based on the comparison to the table, determining one of:

whether the fan motor was running at a time of the cutting of the voltage to the fan motor based on the comparison of the measured electromotive force (EMF) to the table;

a speed of the fan motor at a time of the cutting of the voltage to the fan motor based on the comparison of the measured electromotive force (EMF) to the table; and whether the fan motor is operating below a predetermined or threshold value at a time of the cutting of the voltage to the fan motor based on the comparison of the measured electromotive force (EMF) to the table; and wherein the microcontroller generates, based on the determining by the sensorless fan controller, a mimicking signal that mimics a Hall effect square wave signal, and wherein the microcontroller outputs the mimicking signal that mimics the Hall effect square wave signal.

19. The household appliance according to claim 18, wherein the sensorless fan controller includes:

a speed sensing module that measures the electromotive force (EMF) of the fan motor, and wherein the microcontroller receives the measured electromotive force (EMF) from the speed sensing module.

20. The household appliance according to claim 19, wherein the speed sensing module normalizes the measured electromotive force (EMF) of the fan motor to be within an operating range of the microcontroller.

21. The household appliance according to claim 18, wherein the microcontroller outputs a first mimicking signal that mimics a first Hall effect square wave signal indicating that the fan motor is operating properly if the electromotive force (EMF) conditions of the fan motor are equal to or greater than a predetermined or threshold value, and wherein the microcontroller outputs a second mimicking signal that mimics a second Hall effect square wave signal indicating that the fan motor is operating improperly if the electromotive force (EMF) conditions of the fan motor are less than a predetermined or threshold value.

* * * * *